United States Patent
Pomerantz

Patent Number: 6,122,591
Date of Patent: Sep. 19, 2000

[54] TAXI TRIP METER SYSTEM WITH INDICATION OF FARE AND DISTANCE VIOLATIONS

[76] Inventor: David Pomerantz, 251 174th St., Apt. 504, Miami Beach, Fla. 33160

[21] Appl. No.: 09/136,144

[22] Filed: Aug. 18, 1998

[51] Int. Cl.[7] ............................ G06F 17/00; G06F 165/00
[52] U.S. Cl. ......................... 701/201; 701/208; 705/417
[58] Field of Search ................................. 701/201, 204, 701/207, 208, 209, 213; 705/417

[56] References Cited

U.S. PATENT DOCUMENTS

| | | |
|---|---|---|
| 4,543,572 | 9/1985 | Tanaka et al. . |
| 4,570,228 | 2/1986 | Ahlberg . |
| 4,571,684 | 2/1986 | Takanabe et al. . |
| 4,675,676 | 6/1987 | Takanabe et al. . |
| 4,796,189 | 1/1989 | Nakayama et al. . |
| 4,800,502 | 1/1989 | Steward et al. . |
| 4,984,168 | 1/1991 | Neukrichner et al. . |
| 5,107,433 | 4/1992 | Helldorfer et al. . |
| 5,359,528 | 10/1994 | Haendel et al. . |
| 5,459,667 | 10/1995 | Odagaki et al. . |
| 5,475,598 | 12/1995 | Fushimi et al. . |
| 5,608,635 | 3/1997 | Tamai . |
| 5,612,875 | 3/1997 | Haendel et al. . |
| 5,638,280 | 6/1997 | Nishimura et al. . |
| 5,689,423 | 11/1997 | Sawada . |
| 5,729,731 | 3/1998 | Yajima et al. . |
| 5,734,348 | 3/1998 | Aoki et al. . |
| 5,917,434 | 6/1999 | Murphy .................................... 340/991 |

*Primary Examiner*—William A. Cuchlinski, Jr.
*Assistant Examiner*—Edward Pipala
*Attorney, Agent, or Firm*—Jack Lo

[57] ABSTRACT

A taxi trip meter system includes a taximeter and a location sensor connected to a computer loaded with street information and driver evaluation software. In a first embodiment, the estimated shortest route and distance between the starting and ending points of a trip are determined. If the estimated shortest trip distance is exceeded by an actual trip distance by a permissible margin, a distance violation is indicated. An actual average speed is calculated based on an actual trip duration and the actually traveled distance. If an estimated average speed limit for the actual route is exceeded by the actual average speed, a speed violation is indicated. In a second embodiment, an estimated taxi fare is calculated based on the estimated shortest route. If the estimated taxi fare is exceeded by an actual taxi fare calculated by the taximeter by a permissible margin, a fare violation is indicated.

17 Claims, 3 Drawing Sheets

TAXI TRIP METER SYSTEM WITH INDICATION OF FARE AND DISTANCE VIOLATIONS

BACKGROUND OF THE INVENTION

1. Field of the Invention

This invention relates generally to taximeters.

2. Prior Art

A taxi fare is typically determined by a taximeter based on trip distance and waiting time in traffic. Taxi drivers are free to take whichever route they choose. Riders who are unfamiliar with the area being traversed are sometimes cheated by unscrupulous taxi drivers who take a roundabout route to inflate the fare. Other taxi drivers try to increase income by driving very fast to minimize travel time and thus increasing customer turnover, but at the expense of safety.

OBJECTS OF THE INVENTION

Accordingly, objects of the present taxi trip meter system are:

- to provide an estimated shortest trip distance for an estimated best route;
- to indicate a violation if the estimated shortest trip distance is exceeded by an actual trip distance by a permissible margin;
- to calculate an actual average speed for the trip;
- to indicate a violation if an estimated average speed limit for an actual travel route is exceeded by the actual average speed;
- to provide an estimated taxi fare based on the estimated shortest trip distance and an estimated waiting time in traffic; and
- to indicate a violation if the estimated taxi fare is exceeded by an actual taxi fare by a permissible margin.

Further objects of the present invention will become apparent from a consideration of the drawings and ensuing description.

BRIEF SUMMARY OF THE INVENTION

A taxi trip meter system includes a taximeter and a location sensor connected to a computer loaded with street information and driver evaluation software. In a first embodiment, the estimated shortest route and distance between the starting and ending points of a trip are determined. If the estimated shortest trip distance is exceeded by an actual trip distance by a permissible margin, a distance violation is indicated. An actual average speed is calculated based on an actual trip duration and the actually traveled distance. If an estimated average speed limit for the actual route is exceeded by the actual average speed, a speed violation is indicated. In a second embodiment, an estimated taxi fare is calculated based on the estimated shortest route. If the estimated taxi fare is exceeded by an actual taxi fare calculated by the taximeter by a permissible margin, a fare violation is indicated.

DETAILED DESCRIPTION OF THE INVENTION

Figure 1:
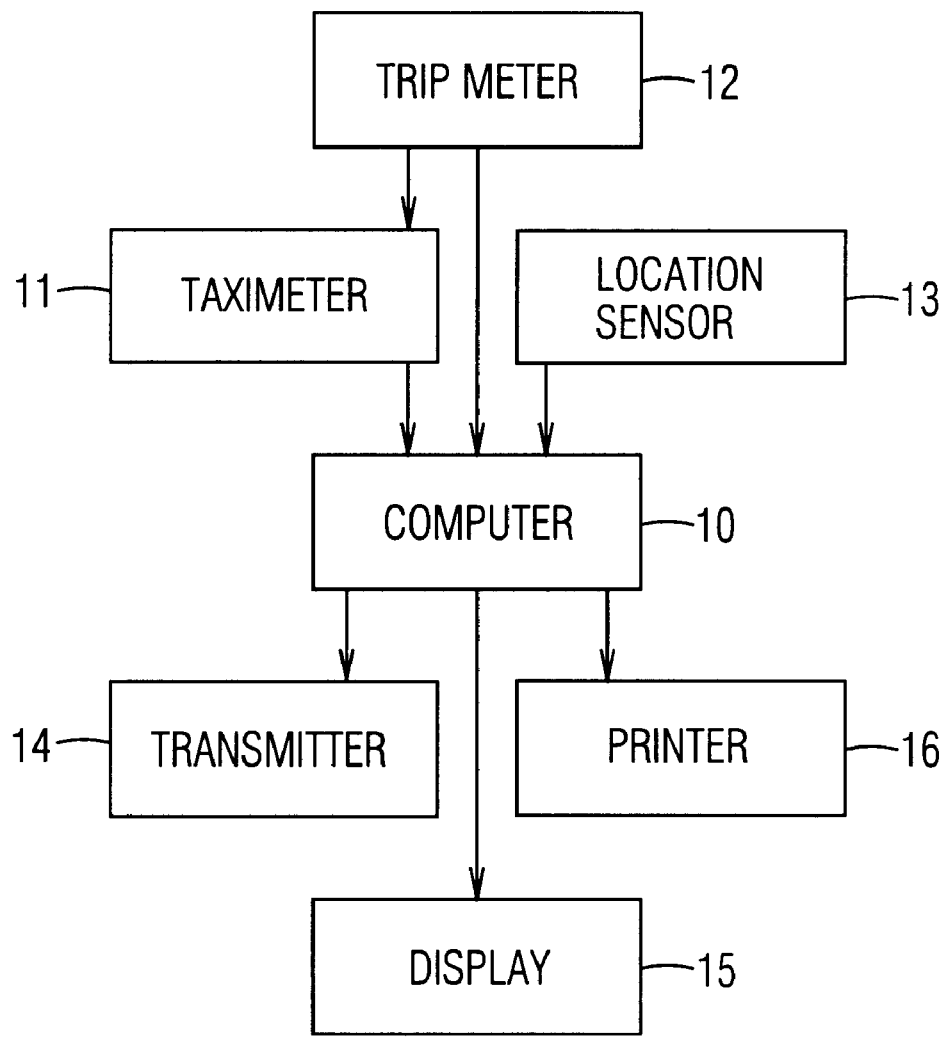
FIG. 1 is a block diagram of the present taxi trip meter system.

FIG. 1: A first embodiment of the present taxi trip meter system is shown in FIG. 1. It is mounted in a vehicle, e.g., a taxi, and includes a computer 10 receiving taxi fare information from a taximeter 11, trip distance information from a trip meter 12, and geographical location information from a location sensor 13. Taximeter 11 also receives input from trip meter 12. Computer 10 may be any type of programmable processor, and is preferably loaded with detailed street and highway information, e.g., from a CD-ROM street navigation program. Location sensor 13 may be any type of device that indicates the precise geographical location of the vehicle, such as a GPS (global positioning satellite) receiver. A radio transmitter 14, a display 15, and a printer 16 connected to computer 10 enable the output of driver evaluation information in different forms.

Figure 2:
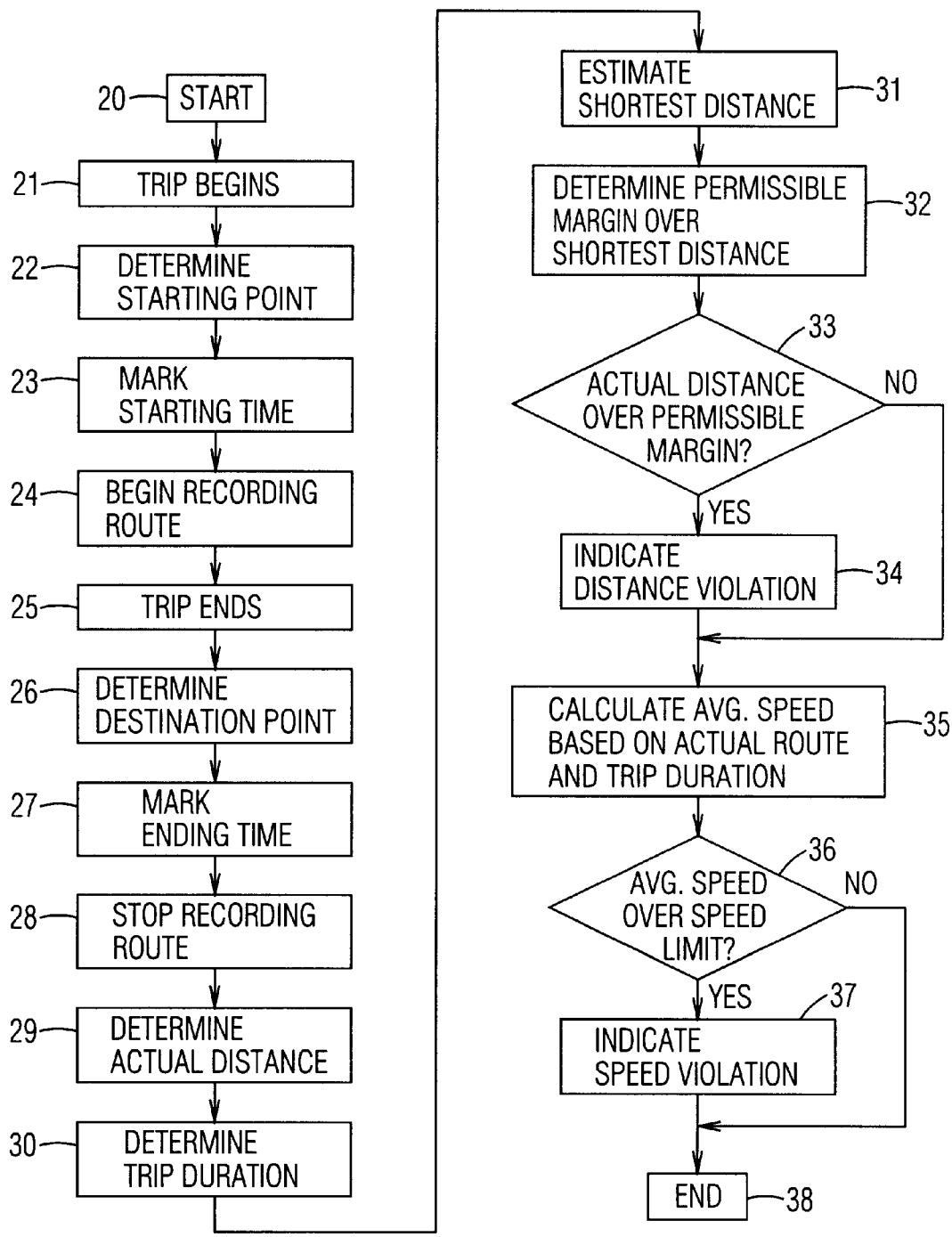
FIG. 2 is a flowchart for a first embodiment of a method implemented by the taxi trip meter system.

FIG. 2: A first embodiment of a taxi trip meter method implement by the system of FIG. 1 is shown in FIG. 2. It is preferably implemented as software or firmware in the computer. The process is started at block 20. When a trip is begun at block 21, e.g., when the taximeter is activated or a specific initiating input is provided to the computer, the geographical starting point is determined at block 22, and the starting time is marked at block 23. A recording of the actual route being traveled is begun at block 24. When the vehicle has reached its destination and the trip is ended at block 25, e.g. when the taximeter is deactivated or a specific terminating input is provided to the computer, the geographical destination point is determined at block 26, and the ending time is marked at block 27. The starting and ending points are determined with the location sensor and the street information loaded in the computer. The recording of the actual route is stopped at block 28. The actual trip distance is determined at block 29 with input from the trip meter or with street information. The actual trip duration is determined at block 30 by calculating the difference between the starting and ending times. Alternatively, a timer may be employed.

Based on available street information, the optimal route and shortest trip distance between the starting and ending points are estimated at block 31 with any suitable method well known in the art. The shortest trip distance is preferably determined for an actual street route, but if the computer is not provided with street information, the straight-line distance between the starting and end points may be considered as the estimated shortest trip distance. A permissible margin over the estimated shortest trip distance is determined at block 32. The margin may be a fixed percentage over the estimated shortest distance, or it may be a variable percentage that is greater for shorter distances, or smaller for longer distances.

The actual trip distance is compared to the estimated shortest trip distance at block 33. If the estimated shortest trip distance is exceeded by the actual trip distance by the permissible margin, a distance violation is indicated at block 34. The indication for the violation may be provided in various forms, e.g., as a transmission to the taxi company headquarters through the transmitter, as information on the display, or as a printout from the printer. The taxi customer and the taxi company are thus notified of an excessively long route taken by the taxi driver. A powerful deterrent is thus provided against cheating by the taxi driver.

A further feature is provided for monitoring driving speed. The average actual speed for the trip is calculated at block 35 based on the actual trip distance and trip duration. If an estimated average speed limit for the actual route, which may be provided as part of the street information, is exceeded by the average actual speed at block 36, a speed violation is indicated at block 37. The process is ended at block 38. A powerful deterrent is thus provided against speeding by the taxi driver.

Figure 3:
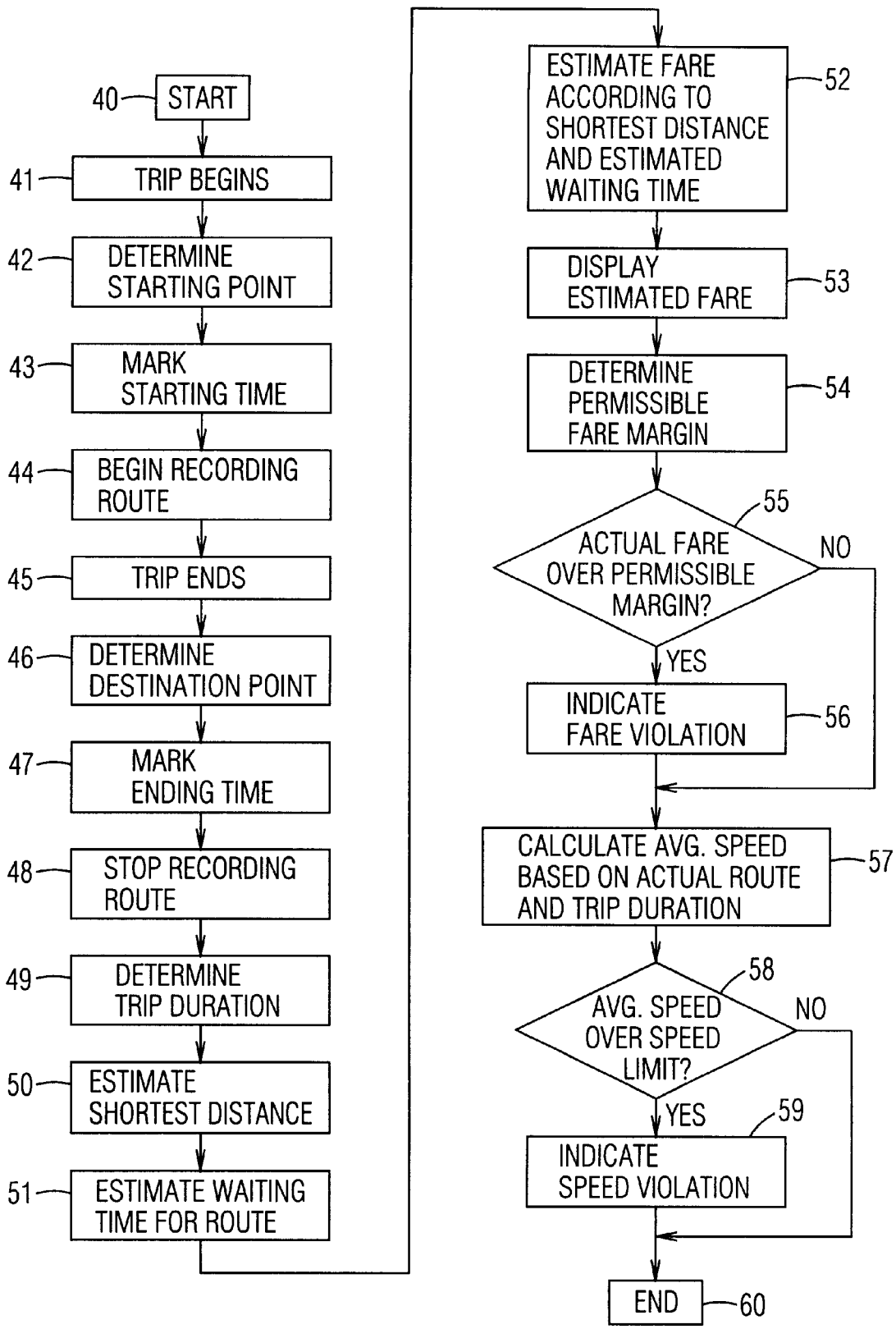
FIG. 3 is a flowchart for a second embodiment of the method implemented by the taxi trip meter system.

FIG. 3: A second embodiment of the taxi trip meter method implement by the system of FIG. 1 is shown in FIG. 3. It is preferably implemented as software or firmware in the computer. The process is started at block 40. When a trip is begun at block 41, e.g., when the taximeter is activated or a specific initiating input is provided to the computer, the geographic starting point is determined at block 42, and the starting time is marked at block 43. A recording of the actual route being traveled is begun at block 44. When the vehicle has reached the destination point and the trip is ended at block 45, e.g. when the taximeter is deactivated or a specific terminating input is provided to the computer, the geographic destination point is determined at block 46, and the ending time is marked at block 47. The starting and ending points are determined with the location sensor and the street information loaded in the computer. The recording of the actual route is stopped at block 48. The trip duration is determined at block 49 by calculating the difference between the starting and ending times. Alternatively, a timer may be employed.

Based on available street information, the optimal route and shortest trip distance between the starting and ending points are estimated at block 50 with any suitable method well known in the art. The shortest trip distance is preferably determined for an actual street route, but if the computer is not provided with street information, the straight-line distance between the starting and end points may be considered as the estimated shortest trip distance. An estimated waiting time in traffic along the optimal route is determined at block 51 based on location traffic information and the time of day to account for traffic lights, traffic congestion, etc. An estimated fare is determined at block 52 based on the estimated shortest trip distance and estimated waiting time, and displayed at block 53. A permissible margin over the estimated fare is determined at block 54. The margin may be a fixed percentage over the estimated fare, or it may be a variable percentage that is greater for lower fares, or smaller for higher fares.

An actual fare computed by the taximeter is compared to the estimated fare at block 55. If the estimated fare is exceeded by the actual fare by the permissible margin, a fare violation is indicated at block 56. The indication for the violation may be provided in various forms, e.g., as a transmission to the taxi company headquarters through the transmitter, as information on the display, or as a printout from the printer. The taxi customer and the taxi company are thus notified of an excessive fare charged by the taxi driver. A powerful deterrent is thus provided against cheating by the taxi driver.

A further feature is provided for monitoring driving speed. The actual average speed for trip is calculated at block 57 based on the actual trip distance and trip duration. If an estimated average speed limit for the actual route, which may be provided as part of the street information, is exceeded by the actual average speed at block 58, a speed violation is indicated at block 59. The process is ended at block 60. A powerful deterrent is thus provided against speeding by the taxi driver.

SUMMARY AND SCOPE

Accordingly, a taxi trip meter system is provided. It provides an estimated shortest trip distance. It indicates a distance violation if the estimated shortest trip distance is exceeded by an actual trip distance by a permissible margin. It calculates an actual average speed for the trip. It indicates a speed violation if an estimated average speed limit for the actual route is exceeded by the actual average speed. It provides an estimated fare based on the estimated shortest trip distance and an estimated waiting time. It indicates a fare violation if the estimated fare is exceeded by an actual fare by a permissible margin.

Although the above description is specific, it should not be considered as a limitation on the scope of the invention, but only as an example of the preferred embodiment. Many substitutes and variations are possible within the teachings of the invention. For example, the starting and ending points may be inputted before the trip to provide advance notice of the fare. The estimated fare based on the optimal route may be used as the actual fare to completely eliminate the possibility of cheating. The trip meter may be eliminated, and the trip distance may be determined with GPS and map data. When a violation is indicated, the recorded route may be reviewed by the taxi company or government authority for excusable causes, such as accidents, parades, road closures, etc. A printed ticket may be provided for the customer for subsequent resolution with the taxi company. The fares calculated by the taximeter and the taxi trip meter system may be considered as including distance information. The trip meter may be indirectly connected to the computer through the taximeter. Therefore, the scope of the invention should be determined by the appended claims and their legal equivalents, not by the examples given.

I claim:

1. A taxi trip meter system for a taxi, comprising:
   a computer;
   a trip meter connected to said computer, said trip meter for measuring an actual trip distance traveled by said taxi between a starting point and a destination point;
   a location sensor providing geographical location information about said taxi to said computer; and
   instructions loaded in said computer instructing said computer to calculate an estimated shortest trip distance between said starting point and said destination point, to compare said estimated shortest trip distance with said actual trip distance, and to indicate a distance violation when said estimated shortest trip distance is exceeded by said actual trip distance by a predetermined distance margin.

2. The taxi trip meter system of claim 1, wherein said location sensor comprises a GPS receiver.

3. The taxi trip meter system of claim 1, further including a transmitter connected to said computer for transmitting violation information.

4. The taxi trip meter system of claim 1, further including a display connected to said computer for displaying violation information.

5. The taxi trip meter system of claim 1, further including a printer connected to said computer for printing violation information.

6. The taxi trip meter system of claim 1, further including a taximeter connected to said computer, and instructions instructing said computer to calculate an estimated taxi fare for said estimated shortest trip distance, and to compare said estimated taxi fare to an actual taxi fare calculated by said taximeter for said actual trip distance, and to indicate a fare violation when said estimated taxi fare is exceeded by said actual taxi fare by a predetermined fare margin.

7. A taxi trip distance violation detection method, comprising:

determining a starting point for a trip;

determining a destination point for said trip;

determining an estimated shortest trip distance between said starting point and said destination point;

determining an actual trip distance traveled by a vehicle after said trip is completed;

comparing said estimated shortest trip distance with said actual trip distance; and indicating a distance violation when said estimated shortest trip distance is exceeded by said actual trip distance by a predetermined distance margin.

8. The taxi trip distance violation detection method of claim 7, wherein said estimated shortest trip distance comprises a driving distance through known roads.

9. The taxi trip distance violation detection method of claim 7, wherein said estimated shortest trip distance comprises a straight line distance between said starting point and said destination point.

10. The taxi trip distance violation detection method of claim 7, further including determining an actual trip duration after said trip is completed, determining an actual average speed, determining an estimated average speed limit for an actual route traveled during said trip, and indicating a speed violation when said estimated average speed limit is exceeded by said actual average speed.

11. The taxi trip distance violation detection method of claim 7, further including recording an actual route traveled during said trip for subsequent review for excusable causes for said distance violation.

12. A taxi fare estimating method, comprising:

determining a starting point for a trip;

determining a destination point for said trip;

determining an estimated shortest trip distance between said starting point and said destination point;

determining an estimated waiting time encountered in traffic during said trip; and determining an estimated taxi fare based on said estimated shortest trip distance and said estimated waiting time.

13. The taxi fare estimating method of claim 12, wherein said estimated shortest trip distance comprises a driving distance through known roads.

14. The taxi fare estimating method of claim 12, wherein said estimated shortest trip distance comprises a straight line distance between said starting point and said destination point.

15. The taxi fare estimating method of claim 12, further including determining an actual taxi fare with a taximeter for an actual trip distance traveled during said trip, comparing said estimated taxi fare to said actual taxi fare, and indicating a fare violation when said estimated taxi fare is exceeded by said actual taxi fare by a predetermined fare margin.

16. The taxi fare estimating method of claim 12, further including determining an actual trip duration after said trip is completed, determining an actual average speed, determining an estimated average speed limit for an actual route traveled during said trip, and indicating a speed violation when said estimated average speed limit is exceeded by said actual average speed.

17. The taxi fare estimating method of claim 12, further including recording an actual route traveled during said trip for subsequent review for excusable causes for said fare violation.

* * * * *